UNITED STATES PATENT OFFICE.

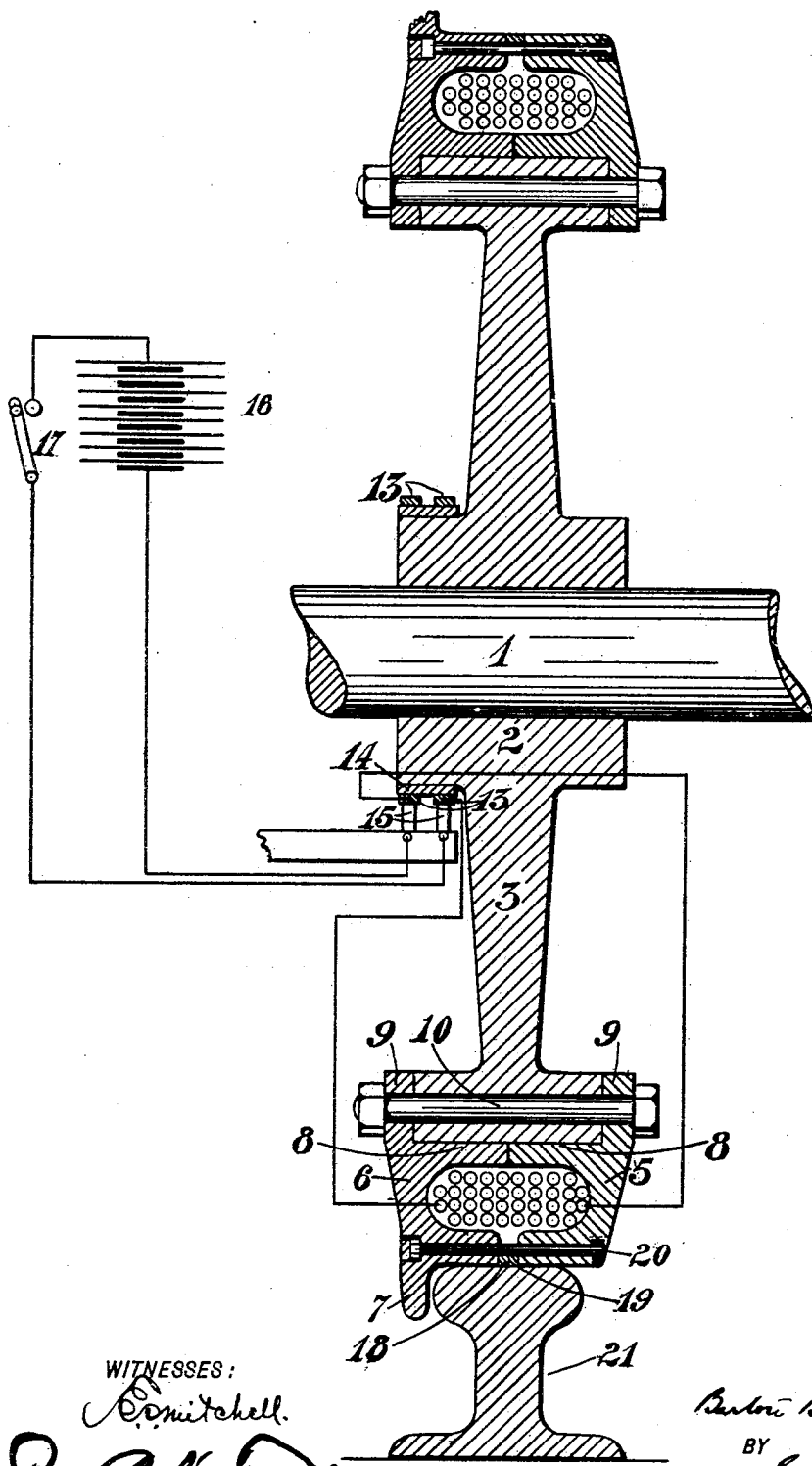

BARTON B. HILL, OF ST. PETERSBURG, RUSSIA.

MAGNETIC TRACTION-WHEEL.

SPECIFICATION forming part of Letters Patent No. 710,691, dated October 7, 1902.

Application filed January 28, 1902. Serial No. 91,564. (No model.)

*To all whom it may concern:*

Be it known that I, BARTON B. HILL, a citizen of the United States, residing at St. Petersburg, Russia, have invented a certain new and useful Improvement in Magnetic Traction-Wheels, of which the following is a description.

My invention relates to improvements in magnetic traction-wheels of the type wherein the magnetizing-coil is arranged internally of the wheel, the latter forming practically an iron-clad bipolar magnet, whereby the rail on which the wheel tracks will act as the armature thereof. With magnetic traction-wheels of this kind as heretofore suggested the proposition has been made to form the wheel of two halves, each having a channel, which coincide with each other to form a chamber for the reception of the coil. Such a device would be expensive to construct and maintain and would not be strong enough for practical use unless made objectionably heavy and bulky. I propose to overcome the objections referred to by using a magnetic rim made preferably sectional and which can be applied to wheels of any desired variety by first removing the flanges and somewhat reducing the thickness of the rims thereof.

The object of my invention, therefore, is to provide an improved magnetic rim capable of being attached to any desired traction-wheel and containing a magnetizing-coil, whereby the rim will form an iron-clad bipolar magnet which when energized will properly increase the tractive effect.

In the accompanying drawing I illustrate the preferred embodiment of the invention in section, showing the electrical connections diagrammatically.

The axle 1 carries the hub 2, having the web or spokes 3 and the rim 4. This rim may be either cast or welded in the shape shown or it may be turned down and planed to that shape from a suitable flanged wheel. The magnetic rim is made of two parts 5 and 6, corresponding with each other, except that the former is provided with the usual flange 7. The horizontal members 8 of these rim-sections preferably tightly grip the rim 4 by shrinking the sections 5 and 6 in position in the usual way; but this may be dispensed with. The vertical members 9 9 of the rim-sections engage the sides of the rim 4, and bolts 10 10 are passed through said members and the rim to hold the rim-sections rigidly in place. The two rim sections as a whole are cast or formed with a chamber or recess 11 therein, in which is mounted a coil 12 of insulated wire of the desired number of turns and resistance. The terminals of this coil may extend to collecting-rings 13, mounted on an insulating-block 14 on the hub 2 and with which the brushes 15 15 coöperate. A source of current 16 (shown diagrammatically as a battery) may be carried on the vehicle for energizing the coil 12, a switch 17 being used to complete and break the circuit. The rim-sections 5 and 6 are so made as that a gap 18 will be formed between their polar extremities, which gap may be conveniently filled with a block 19, made of some tough non-magnetic metal, such as bronze. If desired, tie-bolts 20, made also, preferably, of bronze, so as not to produce a magnetic short circuit, may be extended through the polar extremities of the rim-sections outside of the coil 12, as shown, to overcome the possibility of the rims spreading in use.

At 21 I illustrate an ordinary T-rail on which the wheel is traveling. This rail, it will be noted, will bridge the rim-sections so as to act as an armature for the same, whereby a very powerful magnetic tractive effect will be secured.

Having now described my invention, what I claim as new, and desire to secure by Letters Patent, is as follows:

1. As a new manufacture, a vehicle-wheel provided with a hollow removable rim and a magnetizing-coil mounted in said rim, substantially as set forth.

2. As a new manufacture, a vehicle-wheel provided with a removable sectional hollow rim and a magnetizing-coil mounted in said rim, substantially as set forth.

3. As a new manufacture, a vehicle-wheel provided with a sectional hollow removable rim, a magnetizing-coil mounted in said rim, and a non-magnetic metallic bridge mounted between the polar surfaces of said rim, substantially as set forth.

4. As a new manufacture, a vehicle-wheel provided with a sectional hollow removable rim, a magnetizing-coil mounted in said rim, a non-magnetic metallic bridge mounted between the polar surfaces of said rim, and tie-bolts passing through said polar surfaces, substantially as set forth.

This specification signed and witnessed this 10th day of January, 1902.

BARTON B. HILL.

Witnesses:
FRANK L. DYER,
JNO. ROBT. TAYLOR.